United States Patent [19]

Yoshida et al.

[11] 4,455,327
[45] Jun. 19, 1984

[54] DUAL SURFACE FILM COATING OF RUNNING WEB

[75] Inventors: Tetsuo Yoshida, Fujinomiya; Motohiro Ujihara; Takeshi Watanabe, both of Minami-ashigara; Akira Takagi, Fujinomiya, all of Japan

[73] Assignee: Fuji Photo Film Co., Ltd., Kanagawa, Japan

[21] Appl. No.: 371,166

[22] Filed: Apr. 23, 1982

Related U.S. Application Data

[63] Continuation of Ser. No. 887,400, Mar. 16, 1978, abandoned.

[30] Foreign Application Priority Data

Mar. 22, 1977 [JP] Japan .................. 52-31351

[51] Int. Cl.³ .................. B05D 1/02; B05D 1/38; B05D 5/00
[52] U.S. Cl. .................. 427/131; 427/128; 427/152; 427/424; 118/50; 118/62
[58] Field of Search .................. 34/156; 427/209, 211, 427/348, 358, 424, 131, 128, 152; 118/62, 50; 156/285, 244.11, 244.24

[56] References Cited

U.S. PATENT DOCUMENTS

| 2,689,196 | 9/1954 | Daniels | 34/158 |
| 3,065,098 | 11/1962 | Brooks | 117/34 |
| 3,632,374 | 1/1972 | Greiller | 427/420 |
| 3,782,995 | 1/1974 | Takimoto et al. | 117/34 |
| 4,038,442 | 7/1977 | Utumi | 427/128 |

Primary Examiner—Shrive P. Beck
Attorney, Agent, or Firm—Sughrue, Mion, Zinn, Macpeak, and Seas

[57] ABSTRACT

A first coating liquid 3 is applied to one surface of a continuously running web 1 and fluidity of the first coating layer is eliminated by an air blower 6, after which the web is float supported over a cylindrical blower 7 by static gas pressure. A second coating liquid 11 is applied to the opposite surface of the web in the vicinity of the float region by a freely falling curtain film 12 or by a pressure extruded jet film 15.

7 Claims, 2 Drawing Figures

DUAL SURFACE FILM COATING OF RUNNING WEBsp

This is a continuation of application Ser. No. 887,400, filed Mar. 16, 1978, now abandoned.

BACKGROUND OF THE INVENTION

This invention relates to dual surface coating methods in which a first liquid coating is applied to one surface of a continuously running support web and a second liquid coating is thereafter applied to the other or opposite surface of the web before the first applied coating is dried and solidified.

In the case of photo-sensitive photographic materials, magnetic recording materials, pressure-sensitive copying sheets or the like, it is often required to provide a liquid coating on both surfaces of a web. Heretofore a method has been employed in which a coating is applied to one surface of the web, and after the coating layer has dried and solidified a second coating is applied to the other surface of the web. This method of repeated drying is low in efficiency, however, and therefore a variety of other methods have been proposed to improve production.

One such method is disclosed in Japanese Patent Publication No. 29944/1974 and in Laid Open Japanese Patent Application No. 138036/1975, wherein coating liquids are applied to both surfaces of a web simultaneously by an extrusion method, and with the web transport being controlled by the coating liquid discharge pressure, coating layers are formed on both surfaces of the web. This method suffers from the disadvantage that the web position is liable to vary, however, and thus the distance or spacing between the web and the coating devices correspondingly varies and makes it difficult to uniformly coat the web with the liquids.

In another method when a coating layer coated on one surface of a web has set, the other surface of the web is coated with a liquid by bead coating, extrusion coating, or doctor coating techniques to form a second layer while the surface of the first coating layer is supported by gas pressure. This method also suffers from positional or "floating" variations of the web in a direction perpendicular to its surface, which makes it extremely difficult to maintain a constant distance between the coating device and the web and thus leads to uneven coatings. To overcome these difficulties it has been attempted to support the web by static pressure as disclosed in Japanese Patent Publication Nos. 17853/1974, (corresponding to U.S. Pat. No. 3,496,005) 44108/1974, 19130/1975 and 38737/1976. To obtain a uniform thickness of coating layer by the bead, extrusion or doctor coating methods, however, it is necessary to restrict spacing variations between the coating device and the web to the order of one micron. Accordingly, even using static support pressure techniques it is considerably difficult to precisely control the position of the web, because the maintenance of unvarying static pressure is extremely difficult. It is thus impossible to completely solve the problem of irregularities in the film thickness. When such irregularities are due to float variations of the web, as the frequency x the amplitude of the float vibrations increases, or the frequency x the amplitude/web speed increases, uneven films having lateral defects are formed, which is a fatal defect. The term "lateral defect" used in this specification means an uneven thickness of the coating layer in the longitudinal direction of the web.

SUMMARY OF THE INVENTION

According to the present invention a liquid coating is applied to one surface of a web to form a coating layer thereon, and while the coated surface of the web is supported by gas pressure after the fluidity of the first coating layer had been eliminated, a second liquid coating in the form of a thin film is caused to impinge against the other surface of the web at a predetermined minimum speed or higher.

A method in which a thin liquid coating film is caused to impinge against a web at a predetermined minimum speed or higher is termed a curtain coating method, and is disclosed in U.S. Pat. Nos. 3,508,947, 3,632,374 and 3,632,403 and in Laid Open Japanese Patent Application No. 76151/1975. The invention is not limited to a curtain coating method, however.

It has been found that if coating is carried out in accordance with such a method a sufficiently uniform coating layer thickness can be obtained even if floating variations of the web occur.

The experimental results described above can be explained by the following theoretical analysis. Assume in a curtain coating method that the height of the curtain is represented by h (cm); the thickness of the curtain when it impinge the web is $\delta$ (cm); the flow rate of the liquid coating at the curtain impinge point is Uc (cm/sec); the relative speed between the liquid coating and the web at the impinge point is Ucw (cm/sec); the web speed is Uw (cm/sec); and the wet coating coverage applied is E (cc/m$^2$). Since these parameters vary with the floating variations of the web, their mean values will be represented by $\bar{h}$, $\bar{\delta}$, $\bar{Uc}$, $\bar{Ucw}$, $\bar{Uw}$ and $\bar{E}$, respectively, and their variations by $\Delta h$, $\Delta\delta$, $\Delta Uc$, $\Delta Ucw$, $\Delta Uw$, and $\Delta E$. These parameters can then be expressed by the following equations:

$$h=\bar{h}+\Delta h, \quad \delta=\bar{\delta}+\Delta\delta, \quad Uc=\bar{Uc}+\Delta Uc,$$

$$Ucw=\bar{Ucw}+\Delta Ucw, \quad Uw=\bar{Uw}+\Delta Uw, \text{ and}$$
$$E=\bar{E}+\Delta E.$$

In addition:

$$E=\alpha(\delta\cdot Ucw/Uw),$$

where $\alpha$ is a proportional constant.
If the above equations are substituted into the last equation and the higher order factors are disregarded, then:

$$E=(\alpha Uw)\bar{\delta}\cdot\bar{Ucw}\Delta E(\alpha/Uw)(\Delta\delta\cdot\bar{Ucw}+\bar{\delta}\cdot\Delta\bar{Ucw}).$$

The variation ratio in the wet coating coverage which represents the degree of unevenness in coating, can be represented as:

$$\Delta E/E=(\Delta Ucw/\bar{Ucw})+(\Delta\delta/\bar{\delta}).$$

Now, if the amount of float variation of the web is expressed by the following equation:

$$\Delta h=A\sin\omega t,$$

where A (cm) is a half-cycle amplitude, $\omega$ (1/sec) is the angular velocity, and f (1/sec) is the frequency, then: $\Delta Ucw=d(\Delta h)/dt=A\omega\cos\omega t$.

Furthermore, if it is assumed that the coating liquid flow follows a free drop, then:

$$Uc = \sqrt{2gh} \approx \sqrt{2GH}\{1 + (\Delta h/2\overline{h})\}$$

If the average position of the web is maintained unchanged, then $\overline{Ucw} = \overline{Uc}$, and therefore $\overline{Ucw} = \sqrt{2g\overline{h}}$.

In addition, if it is assumed that $\beta$ is the flow rate (or the volumetric flow rate) per unit width (cc/cm. sec) where $\beta$ is constant, then:

$$\delta \cdot Uc = \beta, \text{ and}$$

$$\delta = \overline{\delta} + \Delta\delta = \beta/Uc \approx (\beta/\sqrt{2g\overline{h}})(1 - \Delta h/2\overline{h}).$$

Therefore, $\overline{\delta} = \beta/\sqrt{2g\overline{h}}$, $\Delta\delta = -(\beta/\sqrt{2g\overline{h}})(\Delta h/2\overline{h})$, and $$\Delta E/\overline{E} = A\omega \cos \omega t/\sqrt{2g\overline{h}} = -A \sin \omega t/2\overline{h}$$

$$= A\sqrt{(\omega^2/2g\overline{h}) + (1/4\overline{h}^2)} \sin(-\omega t + \theta).$$

However, $$\theta = \tan^{-1}(\omega^2/2g\overline{h})/(\tfrac{1}{2}\overline{h}^2), \text{ and}$$

therefore:

$$(\Delta E/\overline{E})\max = A\sqrt{(\omega^2/2g\overline{h}) + (\tfrac{1}{4}\overline{h}^2)}$$

In the curtain coating method, the normally employed curtain height h is greater than or equal to 5 cm, under the condition of which the web float variation frequency range of $f = \omega/2\pi > 10$ Hz comes into question and in the range thereof: $(\omega^2/2g\overline{h}) > (\tfrac{1}{4}\overline{h}^2)$. Given these conditions, then: $(\Delta E/\overline{E})\max = A\omega/\sqrt{2g\overline{h}}$. Thus, the variation in the wet coating coverage is inversely proportional to the speed at which it impinges against the web.

The above equations assume that the coating liquid drops freely to impinge against the web in the form of a thin film, and this assumption is experimentally satisfied in the curtain coating method.

Furthermore, the above equations apply not only where the coating liquid drops freely but also where it is caused to forceably impinge against the web in the form of a thin film. For instance, when coating is carried out by jetting a thin film-shaped coating liquid through a slit-like nozzle under pressure, the jet speed through the nozzle $Us = q/d \cdot 1$ {q: the volumetric flow rate per unit length (cm³/sec.); d: the slit width (cm)} can be used instead of $\overline{Uc} = \sqrt{2gh}$, in which case $(\Delta E/\overline{E})\max = A\omega/(q/d)$.

In the manufacture of photo-sensitive photographic materials, if the thickness of the coated layer varies in a range of from ±(1 to 0.5%) at a relatively high frequency, a fatal defect is often created in the form of a lateral defect. In the coating method according to the invention, however, web float variations much greater than those in conventional bead and doctor coating methods can be tolerated.

DETAILED DESCRIPTION OF THE PREFERRED EMBODIMENTS

Figure 1:
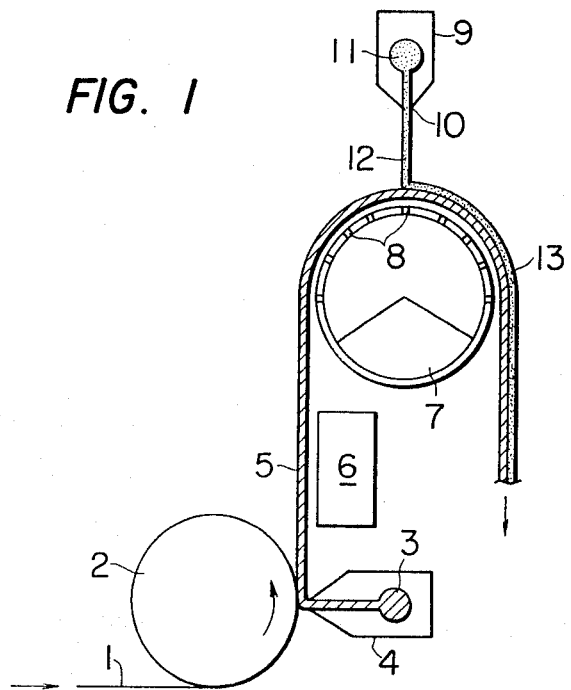
FIG. 1 and FIG. 2 show schematic sectional diagrams of dual web surface coating apparatuses according to alternate embodiments of the invention.

In FIG. 1, while a web 1 is continuously run with one surface supported by a backup roller 2, the other surface is coated with a liquid 3 supplied by a coating device 4 to thereby form a coating layer 5. The fluidity of the coated layer 5 is thereafter eliminated by a setting device 6. While the coated layer 5 is supported by gas blown through slits 8 in a cylindrical blower 7, the opposite surface of the web 1 is coated with a free-falling curtain 12 formed by a second coating liquid 11 extruded in the form of a thin film through a slit 10 of an extrusion type curtain coating device 9, to thereby form a second coating layer 13.

The spatial arrangement of the web 1, the backup roller 2, the coating device 4, the cylindrical blower 7, and the coating device 9 may be varied within relatively wide limits without changing the effects of the invention. Since the float variations of the web are relatively great at the point where it leaves the blower 7, however, it is preferable not to allow the coating liquid 11 to impinge against the web at this point.

In addition, if the angle between the coating liquid 11 and the web immediately before the impingement is an obtuse angle, especially greater than 100 degrees, then the flow direction of the liquid is abruptly changed which may form a liquid pool or cause other problems and lead to unstable and non-uniform coatings.

Figure 2:
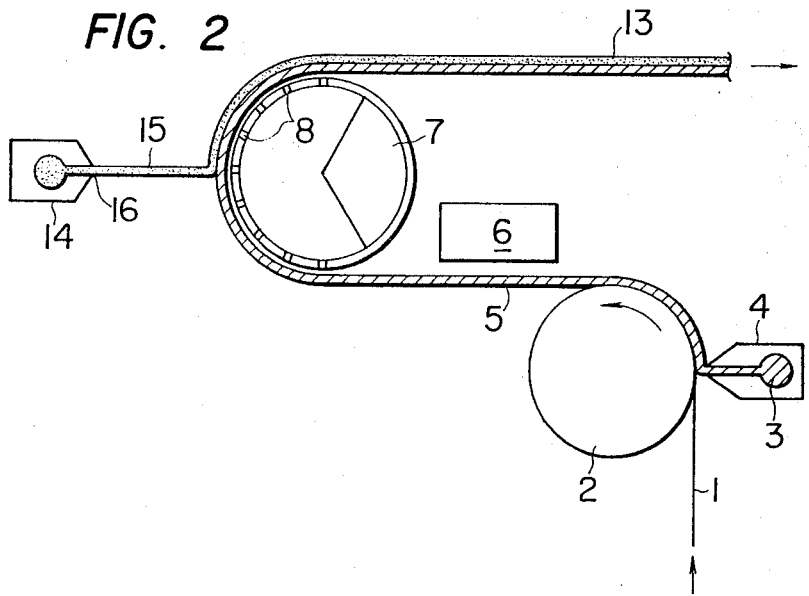

In the alternate embodiment shown in FIG. 2, after the fluidity of a coating layer formed on one surface of a web 1 is eliminated by a setting device 6, while the web is supported by the pressure of a gas blown through slits 8 of a cylindrical blower 7 a second coating liquid 11 is caused to impinge against the opposite surface of the web to coat its other side. Unlike the apparatus shown in FIG. 1, however, a jet extrusion type of liquid coating device 14 is employed to coat the second liquid. Specifically, the second coating liquid 11 is extruded out of the device 14 in the form of a jet stream 15 which impinges against the web to form the second coating layer 13. In this method the coating liquid 11 is not gravity accelerated, and in order to obtain an impinging speed higher than a predetermined value the width of the slit 16 must therefore be made smaller than that of the slit 10 in FIG. 1. The stability of the second coating applied by such an extrusion jet is sometimes inferior to that of the curtain coating method described above, and it is thus generally preferable to employ the latter.

The thin layer of the second coating impinging against the web in FIG. 2 is not limited to a horizontal direction, but may have an upward or oblique direction.

In the above description a single kind of coating liquid is applied to each surface of the web, but the invention is not limited thereto. That is, several different coating liquids may be applied to either or both surfaces of the web.

The method of coating the web with the first liquid 3 is not limited to that shown. That is, it may be applied by the method of impinging a thin coating film against the web, or by a bead coating, an extrusion coating, a gravure coating, an air knife coating, or a blade coating method. A proper coating method should be selected so as to meet the characteristics of a product to be manufactured.

The gas blower is also not limited to the cylindrical form shown. For example, the gas blowers disclosed in Japanese Patent Publication Nos. 17853/1974, 44108/1974, 19130/1975 and 38737/1976 and in U.S. Pat. Nos. 3,635,192 and 3,688,738 may be employed in the invention.

When the first coated surface of the web is supported by the gas it is necessary that the fluidity of the first coating layer be reduced to the extent that its uniformity is not affected by the gas pressure. The necessary setting extent differs depending on the kind of article and the magnitude of the gas pressure required to support the web. For instance, in the case of photo-sensitive materials the coating layer is subject to cool setting and drying, but it is unnecessary to completely dry it and generally no trouble is caused even if the cool setting is not completely achieved. In the case of pressure-sensitive copying sheets, the solid component density in the coating liquid is originally relatively high and most of the liquid component is absorbed by the web immediately after the coating operation. Therefore, even if the gas pressure is applied to the coating layer surface without particular treating it after the initial coating operation, no degradation in quality is caused. The same applies to magnetic recording materials, where the viscosity of the magnetic coating liquid is relatively high and the thickness of the film coating is small.

This invention is extensively applicable to manufacturing articles in which it is necessary to provide coating layers on the dual surface thereof, as in the photo-sensitive materials, the magnetic recording materials, and the pressure-sensitive copying materials.

The devices disclosed in Japanese Patent Publication Nos. 14130/1974, U.S. Pat. No. 3,968,772) 24133/1974 (U.S. Pat. Nos. 3,508,947 and 3,632,374) and 35447/1974 (U.S. Pat. No. 3,632,374) and in Laid Open Japanese Patent Application No. 76151/1975 can be employed in the curtain coating method of the invention. For instance, a slide type device may be employed as the coating device, and to stabilize the curtain a guide rod or an air shield may be used.

When this invention is applied to the manufacture of photo-sensitive materials, all of the coating liquid manufacturing methods, compounds, additives, web materials, and various kinds of treatment disclosed in Japanese Patent Publication Nos. 14130/1974, 24133/1974 and 35447/1974 may be utilized. The coating liquid includes not only photo-sensitive materials such as a photographic emulsion, but also undercoating liquids, liquids for preventing halation, and back layer liquids.

When this invention is applied to the manufacture of magnetic recording materials, the coating liquid manufacturing methods, compositions, additives, web materials, and various kinds of treatment disclosed in Japanese Patent Application No. 154491/1976 (not yet laid open) may be employed.

When the curtain coating method of this invention is applied to the manufacture of magnetic recording materials, it is necessary to provide a device for improving the orientation characteristics of the free-falling curtain to thereby improve the stability of the curtain film. For this purpose a device as disclosed in Japanese Patent Application No. 96675/1976 (not yet laid open) may be employed.

When this invention is applied to the manufacture of pressure-sensitive copying sheets, the methods, compositions, various kinds of treatment, and conditions disclosed in Laid Open Japanese Patent Application No. 2108/1978 may be utilized. Coating solutions for pressure-sensitive copying sheets in this invention contain coating solutions containing microcapsules as a main component, coating solutions containing color developers as a main component and other solutions used in the manufacture of pressure-sensitive copying sheets.

Various coating liquids may also be used in combination. For instance, if the first liquid is a magnetic coating applied in a stripe and a photographic emulsion is the second coating liquid, then a photographic film with a sound track can be manufactured.

It is necessary that the impinging velocity of the second coating liquid against the web be higher than a predetermined value. As is clear from the theoretical explanation above, the lower limit of the impinging velocity is determined from the degree of web float variation and other factors, and it is therefore difficult to previously define a suitable value for the lower limit without determining the embodying conditions. On the other hand, if the impinging velocity is excessively high a coating liquid pool is liable to be formed when the liquid impinges the web depending upon the physical properties of the coating liquid and the coating conditions, which leads to an irregular coating. In addition, in the free-falling curtain coating method the height of the curtain must be considerably increased to provide an excessively high coating liquid impinging velocity. In this case, however, the film curtain may swing and the thickness of the lower portion thereof may extremely decrease and become unstable. Because of these undesirable phenomena it is preferable not to excessively increase the coating liquid impinging velocity. The upper limit of the impinging velocity depends upon the properties of the coating liquid and the coating conditions, however, and rarely exceeds an upper acceptable limit under normal and practical conditions. Although the impinging velocity range should be determined on an experimental basis in each situation, it is generally acceptable in a range of from 0.5-3 m/sec, preferably 1-2.5 m/sec and more preferably to 1.5-2 m/sec.

The curtain coating method according to the invention is not limited to a free-falling curtain. The stable coating is generally obtained by the free-falling curtain coating method. However, when the impinging velocity must be increased, the height of the curtain must be accordingly increased, thereby causing the film curtain to provide the abovedescribed disadvantages. Therefore, sometimes the curtain film can be made more stable by forcibly increasing its impinging velocity. For this reason, an extrusion type hopper is more suitable for curtain coating than a slide hopper because with the former the impinging velocity can be controlled merely by changing the clearance of the slit. Also, in case that coating liquids applied to, for example, magnetic recording materials or pressure-sensitive copying sheets, which have precipitation, quick-drying and thixotropic characteristics are employed, or in case that when two or more liquids are applied in the form of a multi-layer, coating liquids in which vana contracts are liable to be formed on the slide surface are employed, it is preferable to employ an extrusion type hopper.

The gas for supporting the web may be air, nitrogen, helium, carbon dioxide or any gas insofar as it does not badly influence the coating liquid and can be safely handled. From the economical point of view, air is most suitable for supporting the web. Unavailable gas is, for example, such that it chemically react with the coating liquid.

Furthermore, it is desirable that the web support gas is adjusted to contribute to the coating layer. For instance, to accelerate film cooling, solidifying and drying in the manufacture of photo-sensitive materials it is preferable that the gas have a temperature of 0°–23° C., preferably 0°–10° C., more preferably 0°–5° C., and a dew point of −10°–5° C., preferably −10°–0° C.

According to the invention, it is possible to provide a coating layer on one side of the web without causing unevenness in coating layer and without completely drying a coating layer on the other side of the web. Thus, the invention has a novel effect that articles in high quality can be manufactured with high production efficiency.

EXAMPLE

First coating liquids for an emulsion layer and a protective layer of the compositions indicated in Table 1 were simultaneously applied in the form of a multi-layer to a web 1100 mm wide and 180μ thick made of polyethyleneterephthalate for coating the web 1000 mm wide and run continuously at a speed of 60 m/min, by means of a bead coating device with wet coating coverages of 65 cc/m² and 15 cc/m², respectively. Cooling air at 5° C. was then blown against the coated web at a velocity of 5 m/sec for ten seconds to gel the coating layer. Thereafter air at 20° C. from a cylindrical blower 120 cm in diameter was directed against the surface of the first coating layer at a velocity of 25 m/sec to support the web without contact at a float distance of 3 mm with a static pressure of 30 mm H₂O, while second coating liquids identical with the first were applied to the opposite surface of the web by the curtain coating. The height of the curtain was 150 mm, the coating width was 1000 mm, and the wet coating coverages were again 65 cc/m² and 15 cc/m², respectively. Guides were provided on both edges of the curtain to maintain its stability.

After the coating layers thus produced were quickly solidified and dried, their surfaces were observed. The thickness distribution of the coating layers was uniform, and no unevenness in the coatings was found. The inspection was carried out with both reflected light and transmitted light.

TABLE 1

| Coating liquid for emulsion layer | |
|---|---|
| Gelatin | 60 parts by weight |
| Silver Iodobromide | 60 parts by weight |
| Sodium Salt of 2-Hydroxy-4,6-dichloro-s-triazine | 0.3 parts by weight |
| 1-Phenyl-5-mercaptotetrazole | 0.5 parts by weight |
| Water | 879.2 parts by weight |
| Coating liquid for protection layer | |
| Gelatin | 50 parts by weight |
| Sodium Salt of 2-Hydroxy-4,6-dichloro-s-triazine | 0.5 parts by weight |
| Water | 949.5 parts by weight |

What is claimed is:

1. A method of applying a uniform coating to one surface of a continuously running support web to whose opposite surface at least one unsolidified layer of a first coating liquid has been applied, comprising the steps of:
   (a) eliminating a fluidity of the first coating layer,
   (b) applying a static gas pressure to the opposite surface of the web to support it,
   (c) creating a thin jet film of a second coating liquid by pressure extrusion through a narrow elongated slit disposed a predetermined distance from and transverse to the running direction of said web, and
   (d) causing the thin film to impinge against said one surface of the web in the region of its static pressure support at a velocity in the range of 0.5 to 3.0 meters/second to thereby minimize coating thickness variations along said running direction of said web.

2. A method as defined in claims 1 wherein the angle between the thin film and the web at the point where the thin film impinges the web is less than 100°, as measured between the thin film and the incoming side of the web.

3. A method as defined in claims 1, wherein the static gas pressure is applied through slits in a cylindrical blower, whereby the web follows an arcuate path in the region of its static support.

4. A method as defined in claims 1, wherein the second coating liquid includes a composition of a photographic emulsion.

5. A method as defined in claim 1, wherein the second coating liquid includes a magnetic recording composition.

6. A method as defined in claim 1, wherein the second coating liquid includes a pressure sensitive copying paper composition.

7. A method as defined in claim 1, wherein said thin jet film impinges against said one surface of said web in a substantially horizontal direction.

* * * * *